(12) United States Patent
Hubacher

(10) Patent No.: US 6,571,280 B1
(45) Date of Patent: May 27, 2003

(54) METHOD AND APPARATUS FOR CLIENT SIDED BACKUP AND REDUNDANCY

(75) Inventor: Kenneth Hubacher, Cedar Park, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/335,290

(22) Filed: Jun. 17, 1999

(51) Int. Cl.$^7$ .............................................. H04L 12/00
(52) U.S. Cl. ....................... 709/217; 709/226; 707/10
(58) Field of Search ................................. 709/203, 217, 709/278, 220, 226, 228, 206; 707/1, 10, 14, 218

(56) References Cited

U.S. PATENT DOCUMENTS

| | | | |
|---|---|---|---|
| 5,603,029 A | | 2/1997 | Aman et al. ................. 395/675 |
| 5,623,600 A | * | 4/1997 | Ji et al. ........................ 713/201 |
| 5,634,052 A | | 5/1997 | Morris ......................... 395/601 |
| 5,748,897 A | * | 5/1998 | Katiyar ........................ 709/219 |
| 5,828,847 A | | 10/1998 | Gehr et al. ............. 395/200.69 |
| 5,890,165 A | | 3/1999 | Boudrie et al. .............. 707/202 |
| 6,101,508 A | * | 8/2000 | Wolff ........................... 709/216 |
| 6,401,093 B1 | * | 6/2002 | Anand et al. .................. 707/10 |

* cited by examiner

Primary Examiner—Ayaz Sheikh
Assistant Examiner—Khanh Quang Dinh
(74) Attorney, Agent, or Firm—Duke W. Yee; David A. Mims, Jr.; Michael R. Nichols

(57) ABSTRACT

A file request is received by the operating system, and the appropriate IFS driver for the file is called. The IFS driver remaps the drive path based on a drive location list contained in a file redirection table in the IFS driver. Drive or server redundancy is ensured by simultaneously broadcasting writes to each drive on the drive location list. Redundancy is ensured for read operations by sequentially traversing the drive location list in the event of a non-responsive drive or server.

32 Claims, 8 Drawing Sheets

METHOD AND APPARATUS FOR CLIENT SIDED BACKUP AND REDUNDANCY

BACKGROUND OF THE INVENTION

1. Technical Field

The present invention relates to the field of computer systems and transfer of data between a client and server on a distributive network. More particularly, the present invention relates to client sided mapping to a client server. Still more particularly, the present invention relates to a method and system for utilizing client sided mapping for server redundancy and data backup redundancy.

2. Description of Related Art

In a data processing system, a backup/restore subsystem, usually referred to as backup subsystem, is typically used as a means to save a recent copy or version of a file, plus some number of earlier versions of the same file, on some form of backup storage devices, such as magnetic disk drives, tapes, or optical storage devices. The backup subsystem is used as a means of protecting against loss of data in a given data processing system.

For example, if an online version of a file is destroyed or corrupted because of power failure, hardware or software error, user error, or some other type of problem, the latest version of that file which is stored in a backup subsystem can be restored and, therefore, the risk of loss of data is minimized. Another important use of backup subsystems is that, even if failures do not occur but files or data are deleted or changed (either accidentally or intentionally), those files or data can be restored to their earlier state, thus minimizing the loss of data. Therefore, it is readily apparent that backup subsystems are and will remain an important part of the field of data processing.

Installable File System (IFS) technology provides for IFS drivers which map user requests to a specific drive location. For instance, IFS can be used to create a mapped drive on the local client machine at or near boot time. IFS drivers are commonly used to map local drives such as CD-ROM drives and partitioned hard drives. The application alerts the operating system by virtue of the "d" drive letter that an IFS driver will be invoked and the "cdrom" specifies the owner/controller IFS of the CD-ROM drive. An error occurs when the destination drive which was routed by the d:\cdrom IFS driver does not respond.

Problems occur when the supporting server does not respond to a client request for support for a particular application. In the event of a server failure, a redundant backup server may be allocated by the administrator, in which case requests directed to the failed server are routed to the redundant backup server.

Similarly, problems occur when data backup support requested by a client is not responded to by the supporting server. However, rather than the administrator allocating a data backup storage unit at each use, data backup allocation is set at a fixed time, and data backup transfer occurs between client and servers only at low usage times, typically after midnight. The problem of redundancy for data backup is that the storage units and servers which provide a dedicated drive for data backup still require an administrator must take some corrective action drive redundancy. The corrective action involves allocating a redundant data backup storage unit or server and routing all requests directed to the failed storage unit or server to the redundant backup storage unit or server.

A further problem with data backup is that it occurs at low usage times, such as early morning. Therefore, depending on the nature of the failure, the administrator may not have time available to reallocate drives for backing up data within the time required. As a result, no data backup occurs until the next scheduled backup, for example, the next morning.

SUMMARY OF THE INVENTION

The present invention discloses a method and system for providing drive redundancy and backup using IFS drivers. A file request is received by the operating system, and the appropriate IFS driver for the file is called. The IFS driver remaps the drive path based on a drive location list contained in a file redirection table in the IFS driver. Simultaneously broadcasting writes to each drive on the drive location list ensures drive or server redundancy. Redundancy is ensured for read operations by sequentially traversing the drive location list in the event of a non-responsive drive or server.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
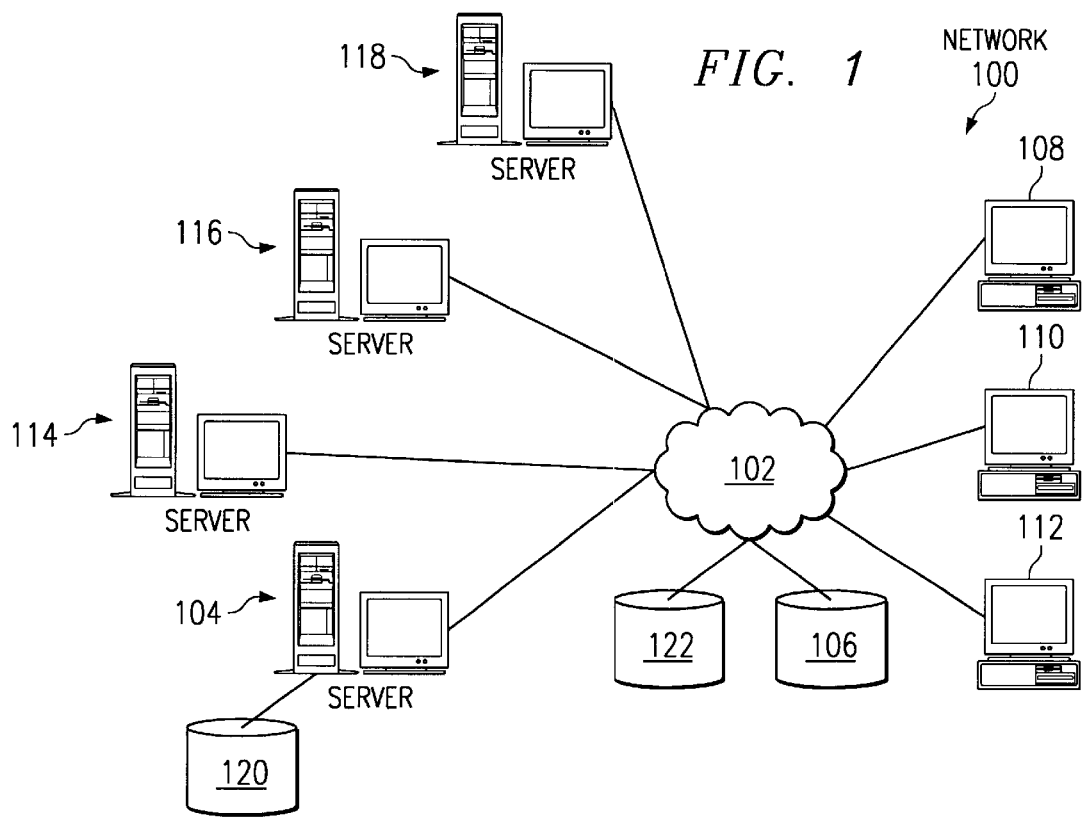
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, clients 108, 110 and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the administrator, in which case requests directed to the failed server are routed to the redundant backup server.

In a similar manner, data backup support is provided by storage units 106 and 122 for servers 104, 114, 116 and 118. However, rather than the administrator allocating a data backup storage unit at each use, data backup allocation is set, and data backup transfer occurs at low usage times, typically after midnight, between any of servers 104, 114, 116 and 118 and storage units 106 and 122.

The problem of redundancy for data backup is that the storage units and servers which provide a dedicated drive for data backup still exist in that if a drive or storage unit fails, an administrator must take some corrective action drive redundancy. The corrective action involves allocating a redundant data backup storage unit or server and routing all requests directed to the failed storage unit or server to the redundant backup storage unit or server.

A further problem with data backup is that it occurs at low usage times such as early mornings. Therefore, depending on the nature of the failure, the administrator may not have time available to re-allocate drives for backing up data within the time required. Thus, no data backup takes place until the next scheduled backup, which is typically the next morning.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention.

Figure 2:
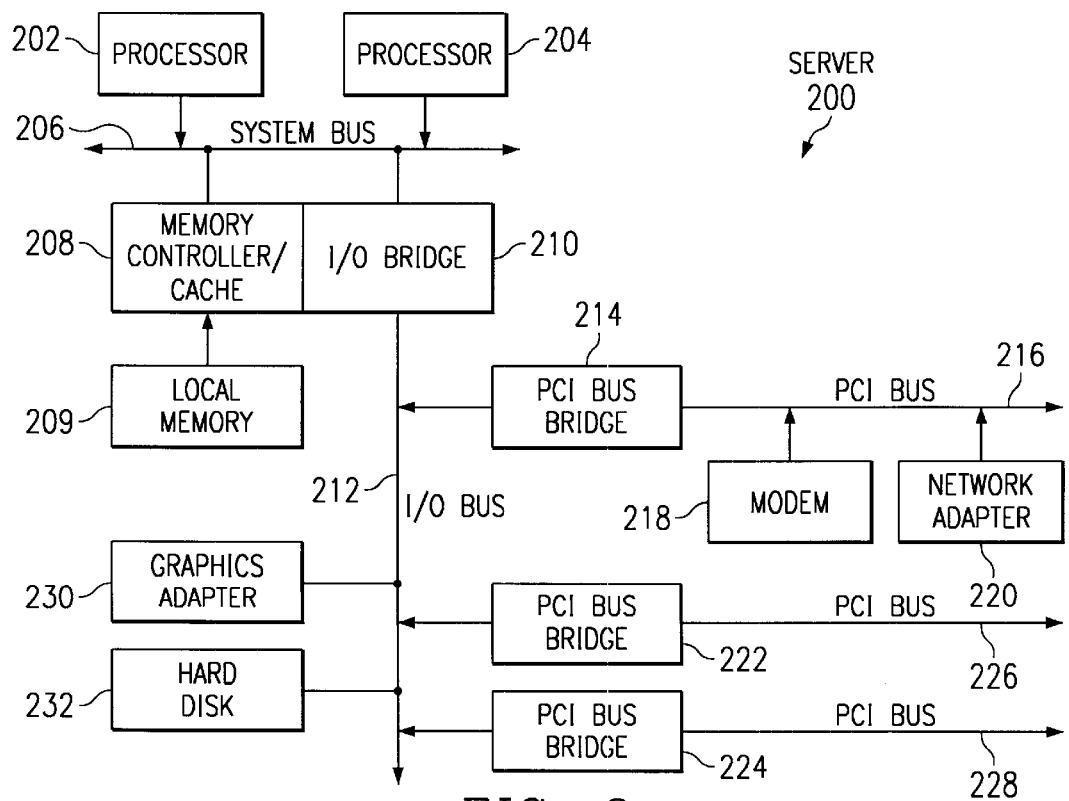
FIG. 2 is a block diagram of a data processing system that may be implemented as a server.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system.

Figure 3:
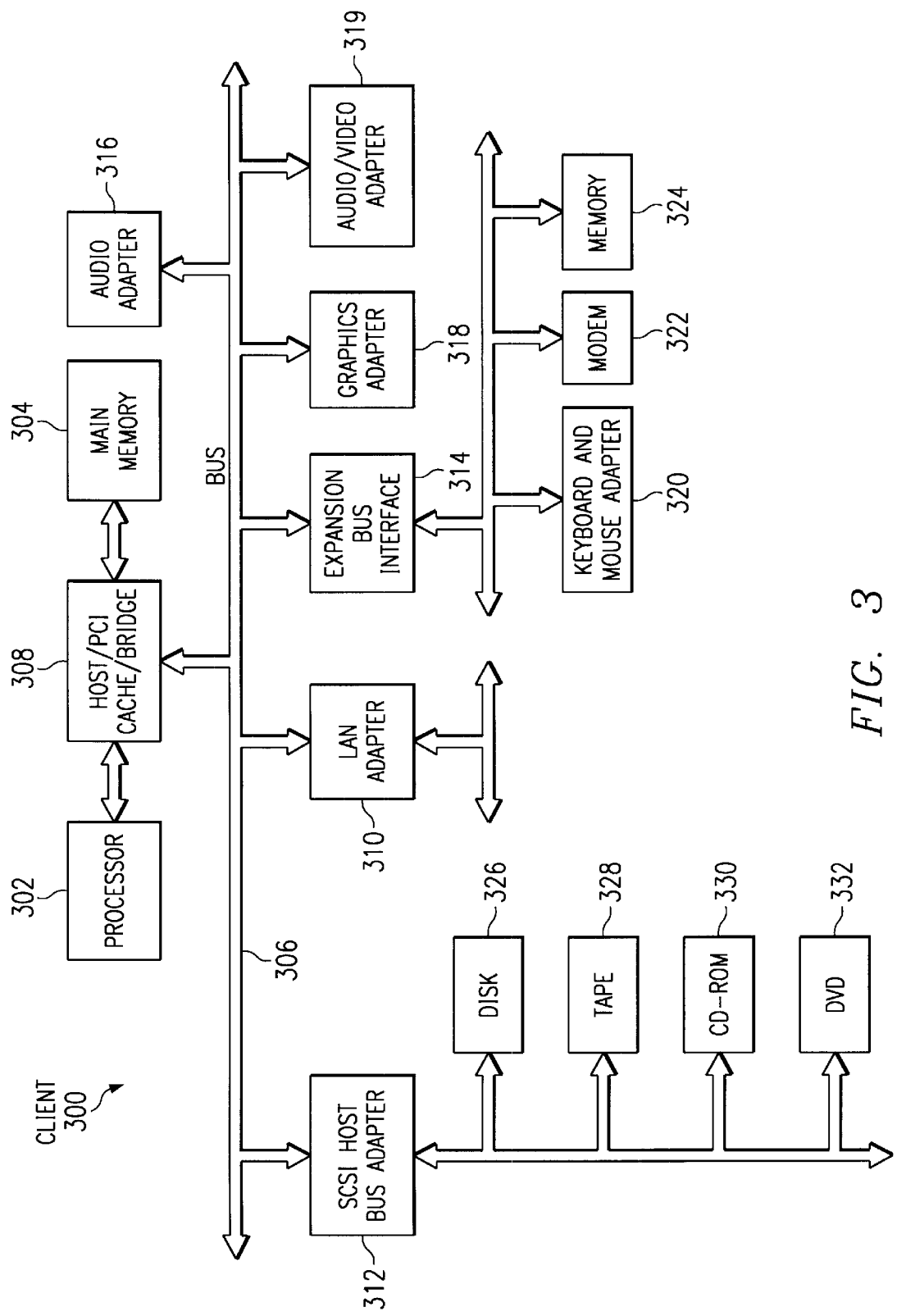
FIG. 3 is a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
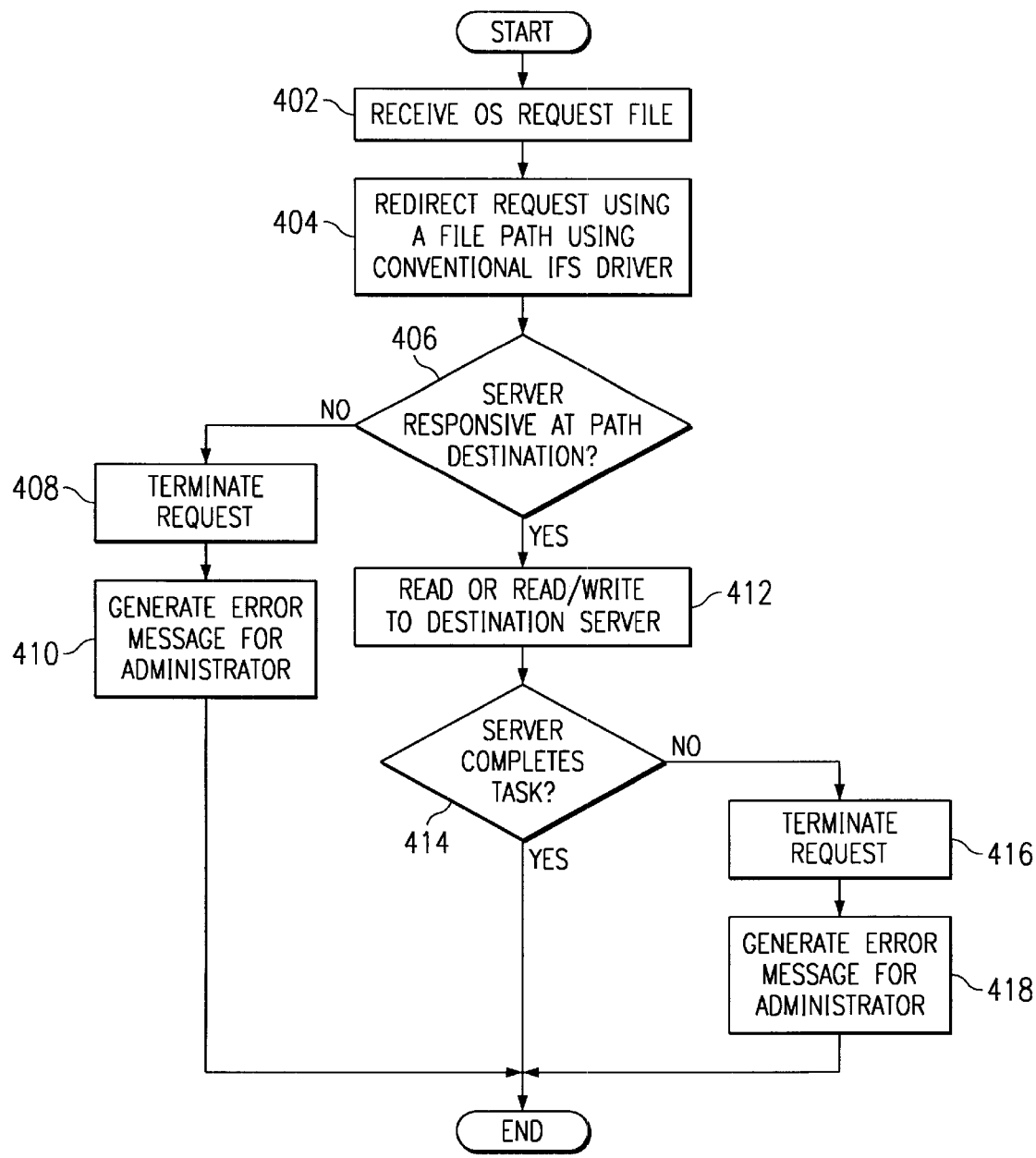
FIG. 4 is a flowchart depicting the prior art process of the operating system requesting a file.

FIG. 4 is a flowchart depicting the prior art process of the operating system requesting a file. The process begins with the operating system receiving a request file (step 402). The operating system then calls up the appropriate Installable File System (IFS) driver for the requested file, and the IFS driver redirects the file request using the file path available from the IFS driver (step 404). Next, a determination is made as to whether the server located at the path destination is responsive to the file request (step 406). If the server is not responsive to the file request, the request is terminated (step 408), and an error message is generated for the administrator (step 410). The process ends immediately after the message is sent to the administrator since the IFS driver has exhausted its destination paths.

Returning to step 406, if the server at the path destination responds, the read or read/write operation is performed at the destination server (step 412). Next, a determination is made as to whether the destination server has completed the task (step 414). If the task is completed, the process ends. Otherwise, the request is terminated (step 416), and an error message is generated for the administrator (step 418). At that point, the process ends.

Figure 5:
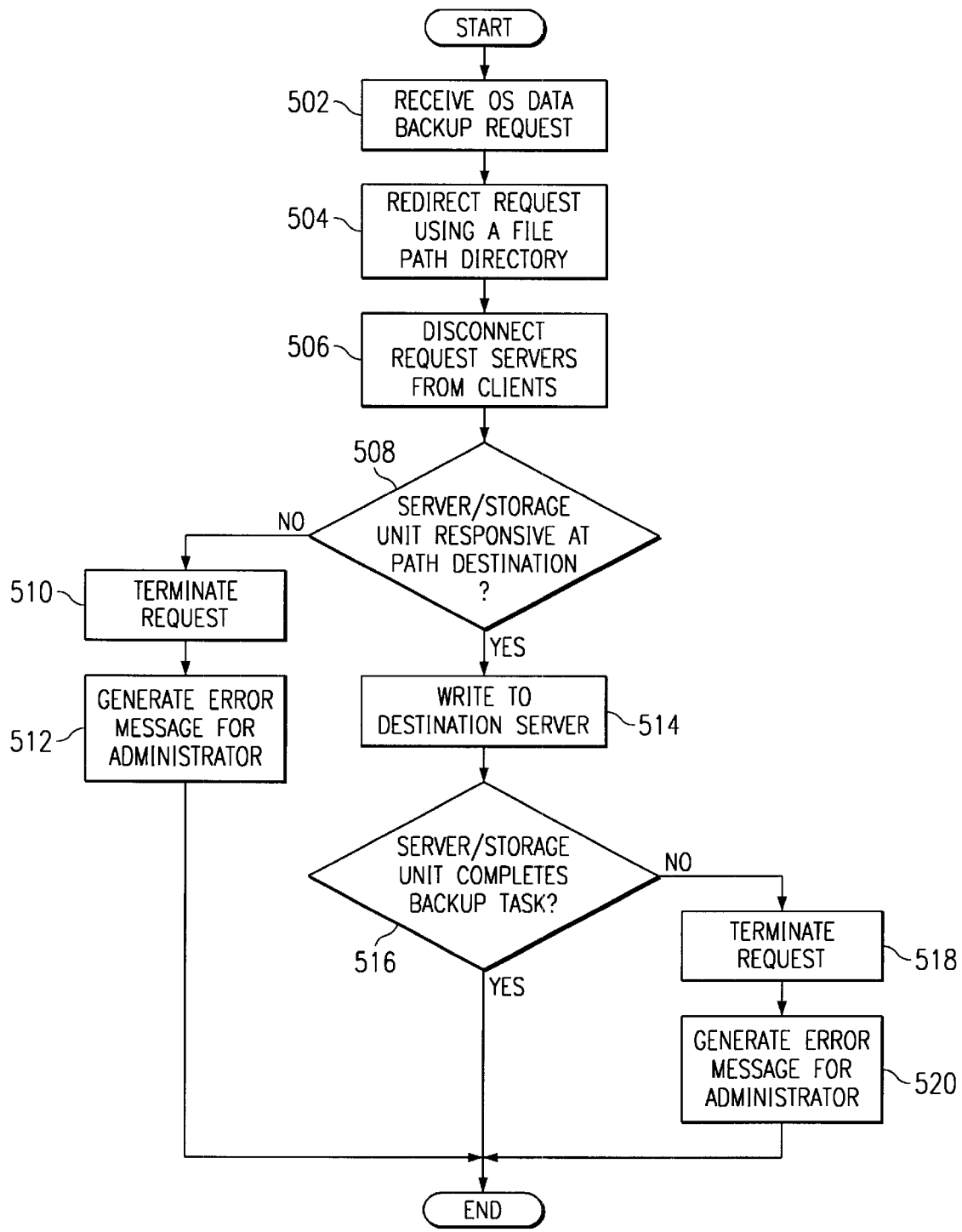
FIG. 5 is a flowchart depicting the prior art method of handling a data backup request.

FIG. 5 is a flowchart depicting the prior art method of handling a data backup request. The process begins with the operating system receiving a data backup request (step 502). It is assumed at the time of the data backup request that the destination server is in a low-use period, such as early morning. The operating system calls up the IFS driver for the requested file, and the IFS driver redirects the file request using the file path available from the IFS driver (step 504). The destination server/storage unit is then disconnected from clients (step 506).

Next, a check is made to see whether the server/storage unit is responsive at the path destination (step 508). If the server/storage unit is not responsive, the data backup request is terminated (step 510), an error message is generated for the administrator (step 512), and the process ends without having accomplished a data backup. On the other hand, returning to step 508, if the server/storage unit is responsive to the request, the client writes to the destination server (step 514).

Finally, a check is made to determine whether the destination server/storage unit has completed the data backup task (step 516). If the task has been successfully completed, the process ends. If the task has not been successfully completed, the request is terminated (step 518), and an error message is generated for the administrator (step 520). At this point, it cannot be assumed that the data backup has been fully performed.

Figure 6:
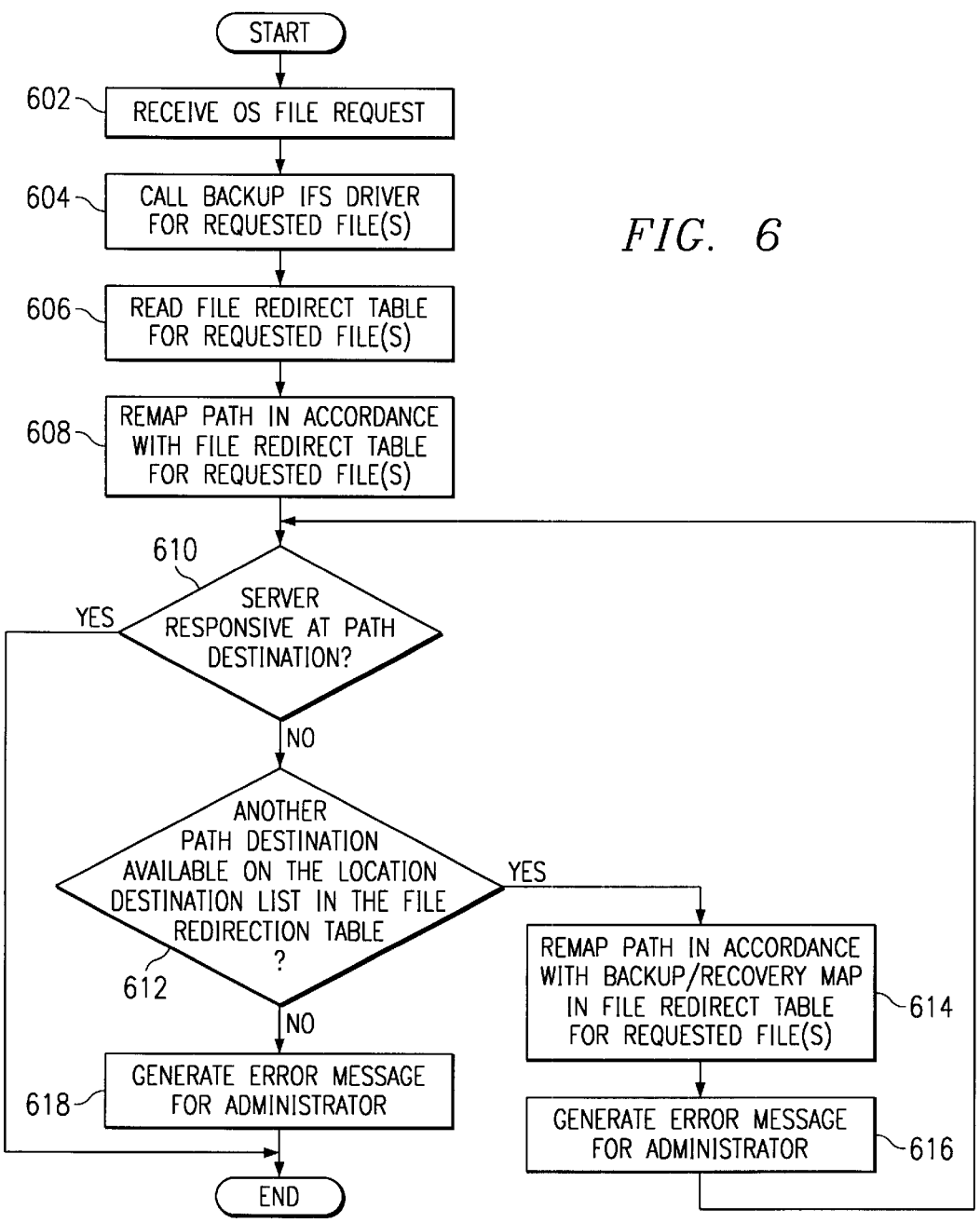
FIG. 6 is a flowchart illustrating a process for using a backup IFS driver for providing redundancy.

FIG. 6 is a flowchart illustrating a process for using a backup IFS driver for providing server redundancy. In accordance with a preferred embodiment of the present invention, the process starts with the operating system receiving a file request (step 602).

The operating system is alerted to the backup IFS driver because the request string commences with a specific drive letter, for example: F:\. The operating system then calls the backup IFS driver (step 604). After the requested file has been called, the IFS driver reads a file redirection table contained within the backup IFS driver for the requested file (step 606). The backup IFS then remaps a destination path in accordance with the destination location for the requested file contained in the file redirection table (step 608).

A determination is then made as to whether the server located at the path destination is responsive to the file request (step 610). If the server is responsive, the process ends. If, however, the server is not responsive, a check is made to determine if another path destination is available on the location destination list in the file redirection table (step 612). If another path destination is available, the backup IFS driver remaps a second destination path in accordance with the second destination location in the location list of the file redirection table for the requested file (step 614). An error message is then generated for the administrator (step 616), and the process returns to decision block 610, where the server at the new destination path is checked for response from the file request.

Returning to decision block 612, if another path destination is not available, that is the entire destination list has been exhausted, an error message is sent to the administrator at step 618, and the process ends without successfully responding to the file request.

An important difference between the process depicted in FIG. 6, as opposed to the processes illustrated in FIGS. 4 and 5, is that the backup IFS driver presents multiple paths for the IFS driver in the event of a non-response (server failure) or for simultaneous writing and data backup. At this point, a distinction should be made with respect to the file redirection table between read file requests and read/write file requests.

In a preferred embodiment of the present invention, the backup IFS driver simultaneously directs read/write files to multiple destination servers. Therefore, in a data backup request, the data is automatically backed up by multiple servers; if one server is down, the data is written to the remaining servers. In the case of a read request, the backup IFS driver sequentially directs read file requests to a plurality of servers; if the first server in the list fails to respond or does not complete the request, the task is automatically re-routed to the next server on the list, and so on and so on, until the task is successfully completed.

Figure 7:
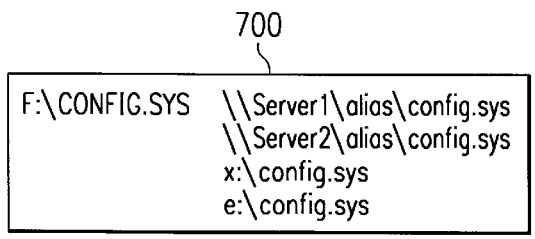
FIG. 7 illustrates a file redirection table found in a backup IFS driver in accordance with a preferred embodiment of the present invention.

FIG. 7 illustrates a file redirection table found in a backup IFS driver in accordance with a preferred embodiment of the present invention. File redirection table 700 is an ASCII-based file split into two common sides. The left side lists the local request (from a client's perspective). The right side lists the different destination locations to either read or read/write files. The granularity on the left side can describe the directory down to the file level. On a read-only operation, the right side destination list would be treated as an order list by priority of destination locations to the read file(s). The read attempt would begin at the top of the list and, if that location is unavailable, it would go to the next location until it receives a response or runs out of listed options.

Specifically, F:\CONFIG.SYS is the local request from the client's perspective. Backup IFS driver 700 is called any time an application calls for a CONFIG.SYS file from the F:\drive. The backup IFS driver initially routes the read request to \\Server1\alias\config.sys. If Server1 fails to respond, the backup IFS driver directs the request to \\Server2\alias\config.sys. If that server fails to respond, the backup IFS driver directs the read request to x:\config.sys. Importantly, the x drive number signifies to the operating system to call up a conventional IFS driver as described above in the prior art system.

Finally, the backup IFS driver calls the last drive on the list, e:\config.sys. Only if the last server does not respond is the task not performed and is intervention by the administrator required. In contrast, a conventional IFS driver fails when the destination driver does not respond, requiring intervention by the administrator.

Figure 8:
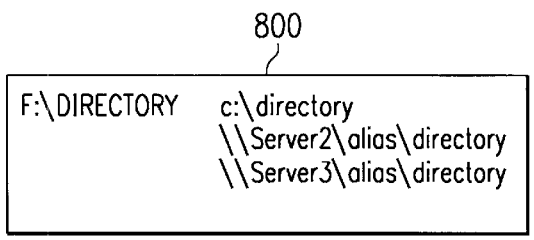
FIG. 8 illustrates a file redirection table found in a backup IFS driver in accordance with a preferred embodiment of the present invention.

FIG. 8 illustrates a file redirection table found in a backup IFS driver in accordance with a preferred embodiment of the present invention. File redirection table 800 is also an ASCII-based file split into two common sides, taken from the client's perspective. The difference between file redirection table 800 and file redirection table 700 is that file redirection table 700 supports write operations. In write operation, the right side describes all of the destination locations the write operation needs to execute. The write is more of a broadcast to all locations to ensure that a real time backup exists. In the depicted example, the write operation local request of F:\DIRECTORY is simultaneously remapped to each of the drives in the right-side list, c:\directory, \\Server2\alias\directory, and \\Server3\alias\directory.

In an alternative embodiment, file redirection tables 700 and 800 are subsections in the same file redirection table. It is possible to combine both read and read/write local requests in the same file redirection table because the backup IFS driver can use file extensions to distinguish between the two types of requests. Other parameters are possible for distinguishing between the two types but need not be discussed herein.

Using the file request type, the backup IFS determines whether the destination locations are sequentially evoked or simultaneously evoked. The backup IFS drive handles read file requests by sequentially traversing the right-side destination location list in the file redirection table, while simultaneously traversing the right-side destination location list for a read/write file request. Thus, a plurality of file redirection tables, as disclosed in FIGS. 7 and 8, may be combined into a single file redirection table which is accessed by file name and traversed in accordance with the type of local file and local file request.

Figure 9:
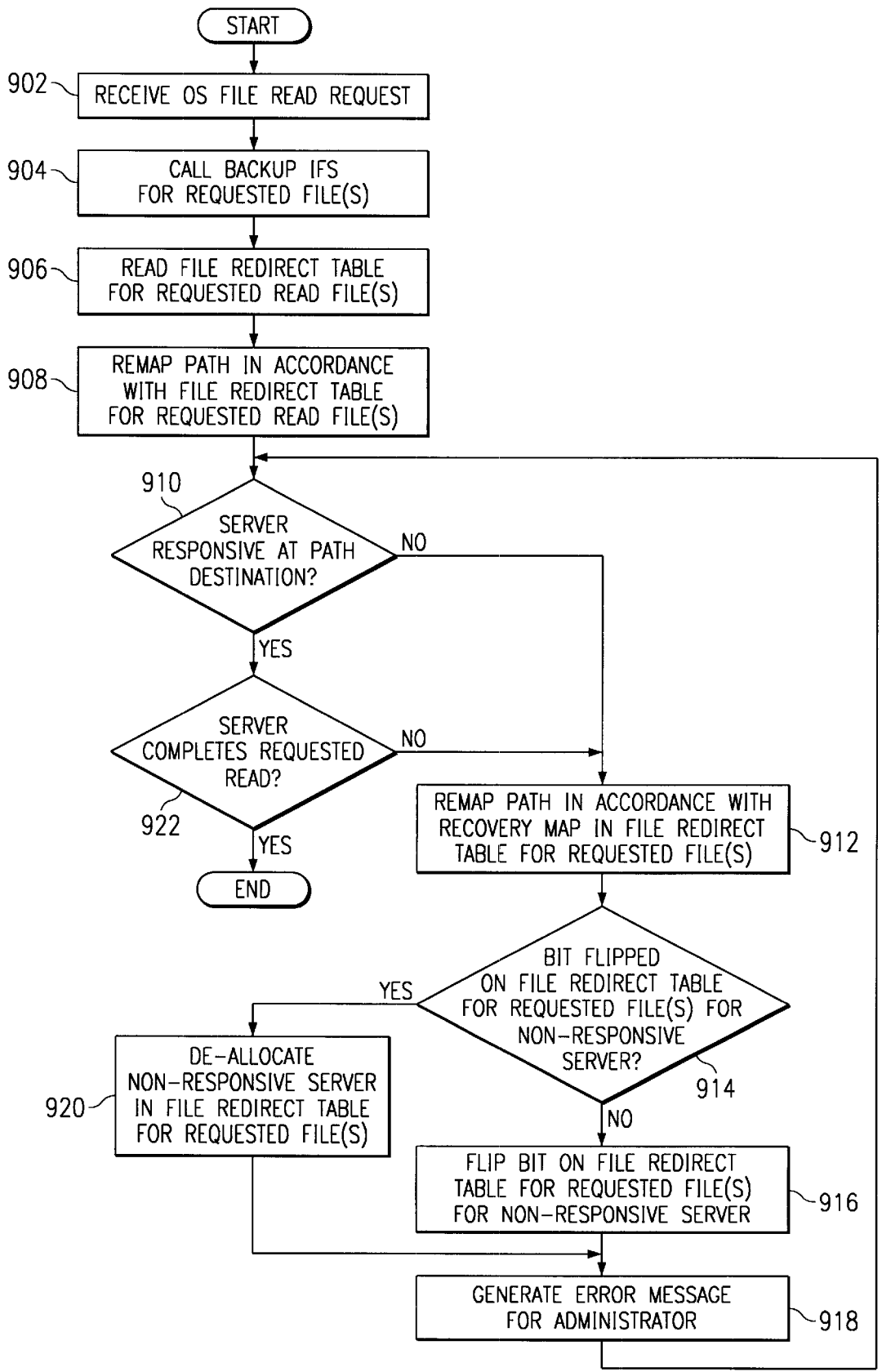
FIG. 9 is a flowchart illustrating the use of a backup IFS driver for a read request in accordance with a preferred embodiment of the present invention.

FIG. 9 is a flowchart illustrating the use of a backup IFS driver for a read request in accordance with a preferred embodiment of the present invention. The process begins with the operating system receiving a file request (step 902). The operating system is alerted to the backup IFS driver because the request string commences with a specific drive letter, indicating to the operating system that a backup IFS driver will be called. The operating system then calls backup IFS driver for the requested file(s) (step 904). The file redirection table for the requested file(s) is then read (step 906), and a remapped path is generated in accordance with the file redirection table for the requested file (step 908).

A check is then made to determine whether the server is responsive at the path destination (step 910). If the server is not responsive, the path is remapped in accordance with the recovery map in the file redirection table for the requested file(s) (step 912). A check is then made to determine whether a bit has been flipped in the file redirection table for the requested file(s) with respect to the non-responsive server (step 914). If the bit has been flipped, the non-responsive server is de-allocated in the file redirection table for the requested file(s) (step 920). An error message is then generated for the administrator (step 918).

On the other hand, if the bit associated with the non-responsive server has not been flipped, the bit is flipped in the file redirection table for the requested file(s) for the non-responsive server (step 916). An error message is then generated for the administrator (step 918). Then, process returns to step 910, where a determination is made as to whether the server is responsive at the path destination.

At this time, a check is made on the remapped path or the second server in the right-side location list of the file redirection table. At some point, the server is found that is responsive, and the process flows to step 922, where a determination is made as to whether the requested read was successfully completed. If the read was successfully completed, the process ends. If not, the process flows back to step 912, where the drive is remapped in accordance with the recovery map in the file redirection table for the requested files.

The bit is then checked for the non-responsive server (step 914). If the bit has been flipped, the server is de-allocated (step 920), and an error message is generated (step 918). If the bit has not been flipped, the bit is flipped in the file redirection table (step 916). An error message is generated at step 918, and the process returns to step 910, where the next server on the location list is presented with the read request. The determination is again made as to whether that server is responsive. The process continues to loop around until a responsive server is found which can complete the read operation.

Figure 10:
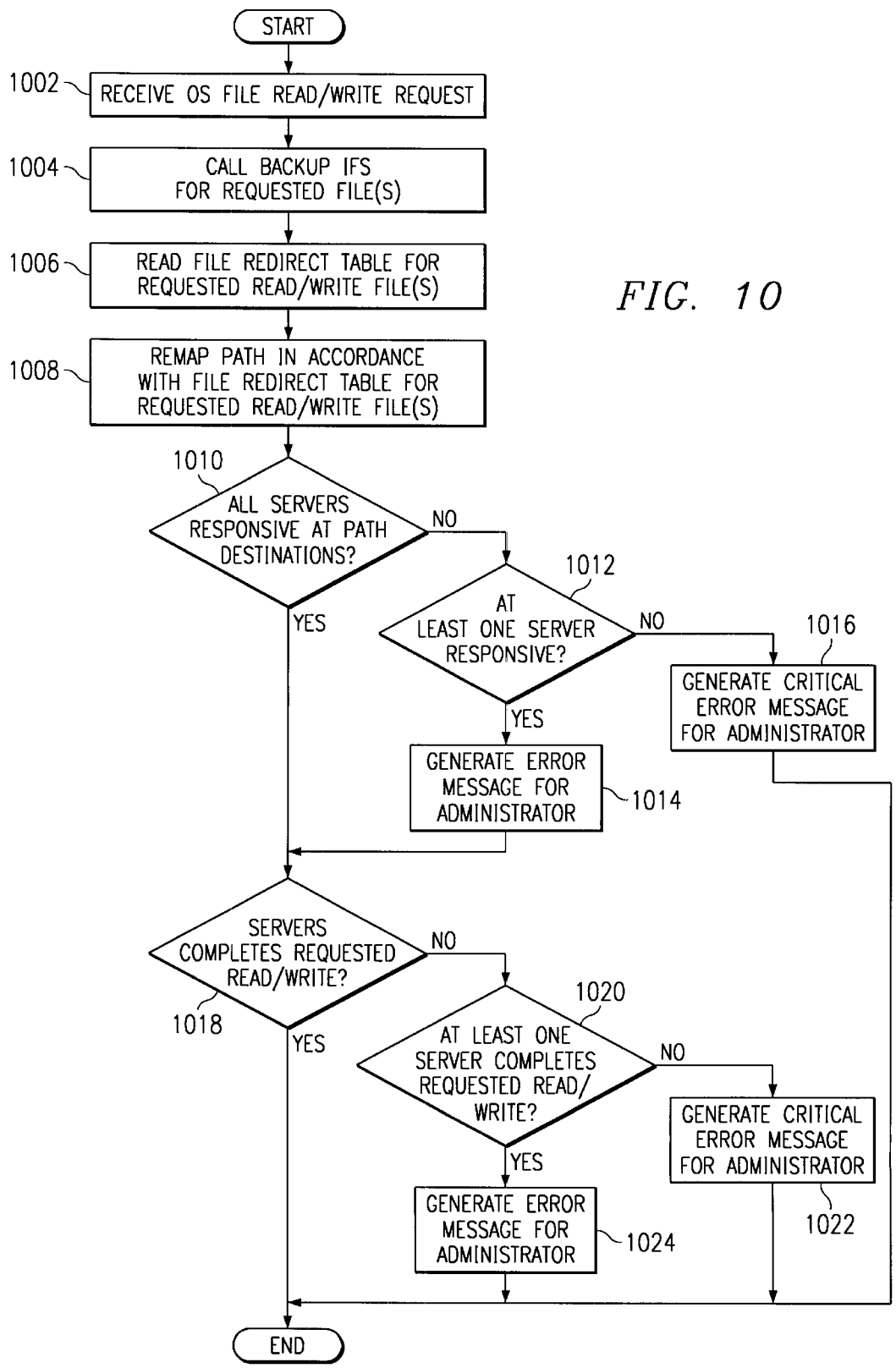
FIG. 10 is a flowchart which illustrates the use of a backup IFS driver for a read/write request in accordance with a preferred embodiment of the present invention.

FIG. 10 is a flowchart that illustrates the use of a backup IFS driver for a read/write request in accordance with a preferred embodiment of the present invention. The process starts with the operating system receiving a read/write request (step 1002). The operating system calls the backup IFS driver associated with the requested file(s) (step 1004). A file redirection table in the backup IFS driver is read for the requested read/write file(s) (step 1006). The drive path is then remapped in accordance with the file redirection table for the requested read/write file(s) (step 1008).

Each location destination is mapped for the requested file(s). These destination location servers are accessed simultaneously, in a broadcast-like write operation. Once the path destination location servers have been contacted, a determination is made as to whether all servers have been responsive (step 1010). If not all the servers have been responsive to the read/write request, a check is made to determine if at least one server has been responsive (step 1012). If at least one server has been responsive, an error message is generated for the administrator (step 1014). The process then flows to step 1018, which will be discussed later.

Returning to decision step 1012, if at least one server has not been responsive, then a critical error message is generated for the administrator (step 1016).

In this case, because no servers are responsive for handling the read/write request, the process ends with the critical error message being sent to the administrator.

Returning to step 1014, subsequent to the determination that at least one destination location server is responsive and the error message being generated for the administrator, a check is made to determine whether the responsive destination location servers have completed the requested read/write (step 1018). If all responsive destination location servers have completed the requested read/write, the process ends. If at least one of the responsive destination location servers has not completed the read/write operation, a check is made to determine if at least one responsive destination location server completed the read/write operation (step 1020). If at least one server completed the read/write operation, an error message is generated for the administrator (step 1024). When at least one responsive destination location server completes the write task, the user is guaranteed that the data has been backed up on at least one server.

Returning to decision 1020, if at least one responsive destination location server has not completed the read/write operation, a critical error message is generated for the administrator, and the process ends without having completed the read/write request. In fact, the user is virtually guaranteed that the data was not backed up and only the original copy of the data exists.

Figure 11:
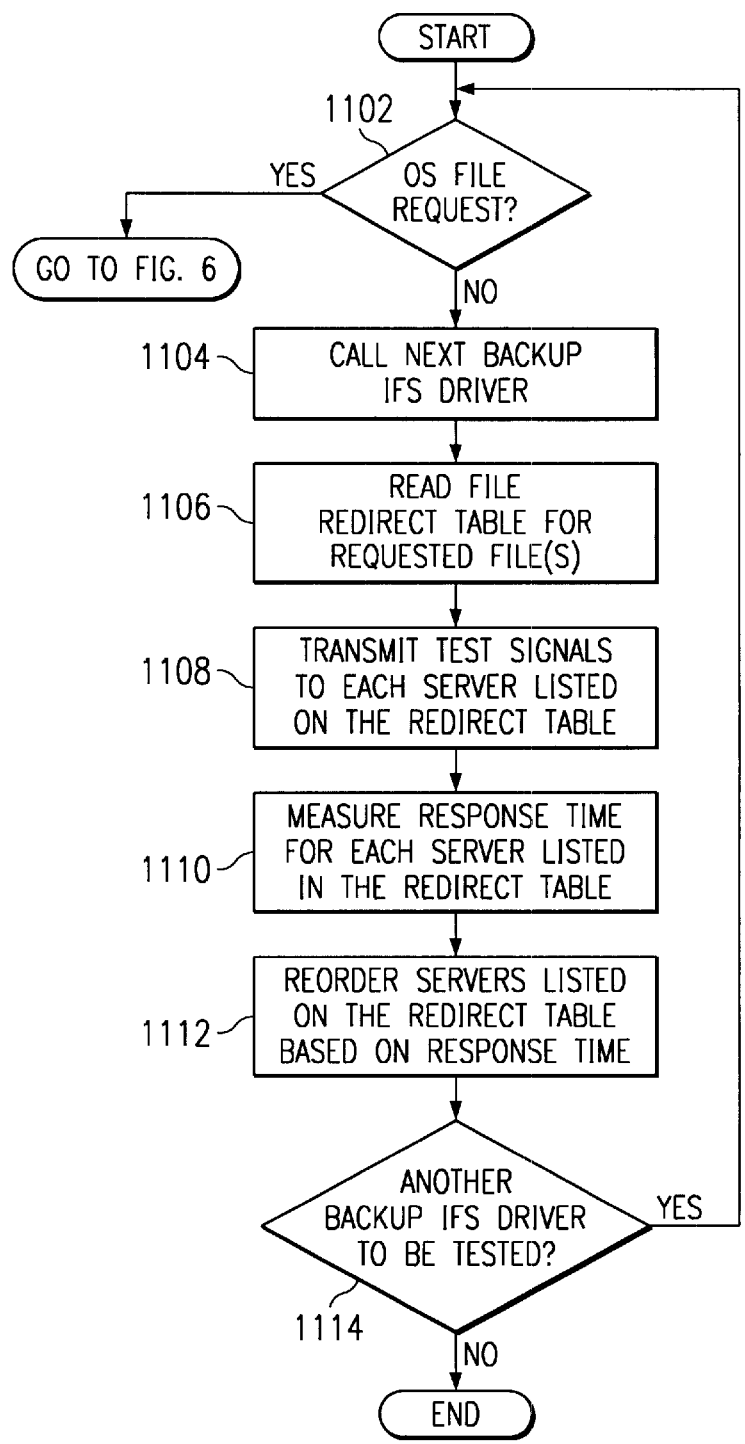
FIG. 11 is a flowchart depicting an optimizing technique for reordering the right-side location list in the file redirection table.

FIG. 11 is a flowchart depicting an optimizing technique for reordering the right-side location list in the file redirection table. The process begins with a determination being made as to whether the operating system has received a file request. If the operating system has received a file request, the process performs the method depicted in FIG. 6. If, on the other hand, no file request is being handled by the operating system, the operating system calls the next backup IFS driver (step 1104).

The operating system then reads the file redirection table for the requested file(s) (step 1106). Next, test signals are transmitted to each server listed in the file redirection table (step 1108). The response time for each server listed in the file redirection table is measured (step 1110). Using the response time results, the right-side location list is reordered in descending order (step 1112). In so doing, the servers with the fastest response times head the list and will be the first drive paths to be attempted in the event of a file request.

A check is then made to determine whether another backup IFS driver is to be tested. Clearly, there are a number of methods for determining when it is appropriate to test the backup IFS drivers. For instance, they may be tested after a threshold number of uses or after a specified period of time has expired between testings. If it is determined that another backup IFS driver is available for testing, the process returns to decision step 1102, and it is determined if the operating system has received a file request.

The process proceeds as described immediately above. If at decision 1104 no other backup IFS drivers are available for testing, the optimization process is complete.

In addition, or alternatively, the above process may contact the administrator with the transmission test results. The administrator may then tweak the servers for optimum performance. More importantly, the administrator is made aware of potential performance problems and existing performance problems, such as a server being down. The administrator may then take corrective action on a failed server before a user attempt to read from the server or write to the server. Thus, the backup IFS driver does not send an error message to the administrator because the server problem was detected in the optimization routine, not during a read or read/write operation.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system implemented method for remapping a path to file servers wherein the data processing system has a resident operation system and at least one application, the method comprising:

presenting a file request to the operation system, wherein the file request includes a first path to a file, and wherein the file request is initiated by the application;

calling a file request redirection driver;

indexing the file request to a second path designated by the file request redirection driver, wherein indexing the file request includes sequentially traversing a destination location list and assigning a next available destination location server on the destination location list as a destination location server for a second path, and wherein the destination location server is the first destination location server;

receiving no response from the first destination location server for a second path;

destination a non-response destination location server in the destination location list as an available destination location server;

sequentially traversing the destination location list;

assigning a next available destination location server as a second destination location server for a third path; and redirecting the file request from the first path included in the file request to the third path designation by the file request redirection driver.

2. The method recited in claim 1, wherein the file request redirection driver is a backup installable file system driver.

3. The method recited in claim 2, wherein the backup installable file system driver includes a file redirection table and further, wherein the step of indexing the file request is performed on the file redirection table.

4. The method recited in claim 1, wherein the file request further comprises a unique drive designation.

5. The method recited in claim 4, wherein the step of calling a file request redirection driver is based on the unique drive designation.

6. The method recited in claim 1, wherein the steps of receiving no response, designating the destination location server, sequentially traversing the destination location list, assigning a next responsive destination location server, and redirecting the file request, are recursively performed until a destination location server responds to the request.

7. The method recited in claim 1, wherein the file request includes a read request.

8. The method recited in claim 1, wherein the step of indexing the file request further comprises:
   simultaneously traversing a destination location list; and
   assigning all available servers as destination location servers for a second path.

9. The method recited in claim 8, wherein the file request includes a write request.

10. The method recited in claim 1, further comprising:
    determining a type of the file request,
    wherein at least one of the second path and the third path is designated by the file request redirection driver based on the type of file request.

11. The method recited in claim 10, wherein the step of determining the type of the file request includes examining a file extension associated with the file request.

12. The method recited in claim 10, wherein the type of the file request is a read request type.

13. The method recited in claim 10, wherein the type of file request is a write request type.

14. A data processing system implemented method for remapping a path to file servers wherein the data processing system has a resident operation system and at least one application, the method comprising:
    presenting a file request to the operation system, wherein the file request includes a first path to a file, and wherein the file request is initiated by the application;
    calling a file request redirection driver;
    indexing the file request to a second path designated by the file request redirection driver, wherein indexing the file request includes sequentially traversing a destination location list and assigning a all available servers as destination location servers for a second path;
    determining if at least one destination location server has responded to the file request;
    performing a first specified task on the basis of the determination that at least one destination location server has response to the file request; and
    performing a second specified task on the basis of the determination that at least one destination location server has not response to the file request; and
    redirecting the file request from the first path included in the file request to a second path designation by the file request redirection driver.

15. A data processing system implemented method optimizing remapping a path to file servers, wherein the data processing system has a resident operation system and at least one application, the method comprising:
    determining if a file request has been presented to the operation system for a file request redirection driver, wherein the file request includes a first path to a file, and wherein the file request is initiated by the application;
    calling the next file request redirection driver;
    identifying a list of destination location servers for a specific file request;
    transmitting a test signal to each destination location server in the list of destination location servers;
    receiving a response from each destination location server acknowledging that each destination location server received the transmitted test signal;
    measuring the response time associated with each destination location server; and
    reordering the list of destination location servers based on the response time associated with each destination location server.

16. A data processing system for remapping a path to file servers wherein the data processing system has a resident operation system and at least one application, the method comprising:
    presenting means for presenting a file request to the operating system, wherein the file request includes a first path to file, and wherein the file request is initiated by the application;
    calling means for calling a file request redirection driver;
    indexing means for indexing the file request to a second path designated by the file request redirection driver, wherein the indexing means for indexing the file request includes sequential means for sequentially traversing a destination location list and assigning means for assigning a next available destination location server for a second path;
    designating means for designating a non-responsive destination server in the designation location list as an unavailable destination location server;
    sequential means for traversing the destination location list;
    assigning means for assigning a next available destination location server as a second destination location server for a third path; and
    redirecting means for redirecting the file request from the first path included in the file request to the third path designation by the file request redirection driver.

17. The method recited in claim 16, wherein the file request redirection driver is a backup installation file system driver.

18. The system recited in claim 17, wherein the backup installable file system driver includes a file redirection table and further, wherein the indexing means for indexing the file request is performed on the file redirection table.

19. The method recited in claim 16, wherein the file request further comprises a unique drive designation.

20. The system recited in claim 19, wherein the calling means for calling a file request redirection driver is based on the unique drive designation.

21. The system recited in claim 16, wherein the receiving means for receiving no response, designating means for designating the destination location server, sequential means for sequentially traversing the destination location list, assigning means for assigning a next responsive destination location server, and redirecting means for redirecting the file request, are recursively performed until a destination location server responds to the request.

22. The system recited in claim 16, wherein the file request includes a read request.

23. The system recited in claim 16, wherein the indexing means for indexing the file request further comprises:
    simultaneous means for simultaneously traversing a destination location list; and
    assigning means for assigning all available servers as destination location servers for a second path.

24. The system recited in claim 23, wherein the file request includes a write request.

25. The method recited in claim 16, further comprising:

determining means for determining a type of the file request, wherein at least one of the second path and the third path is designated by the file request redirection driver based on the type of file request.

26. The system recited in 25, wherein the determination means for determining the type of the file request includes examining a file extension associated with the file request.

27. The system recited in 25, wherein the type of file request is a read request type.

28. The system recited in 25, wherein the type of file request is a write request.

29. A data processing system for remapping a path to file servers wherein the data processing system has a resident operation system and at least one application, the method comprising:

presenting means for presenting a file request to the operating system, wherein the file request includes a first path to file, and wherein the file request is initiated by the application;

calling means for calling a file request redirection driver;

indexing means for indexing the file request to a second path designated by the file request redirection driver, wherein the indexing means for indexing the file request includes simultaneous means for simultaneous traversing a destination location list and assigning means for assigning a next available destination location server for a second path;

determining means for determining if at least one destination location server has responded to the file request;

performing means for performing a first specified task on the basis of the determination that at least one destination location server has response to the file request; and performing means for performing a second specified task on the basis of the determination that at least one destination location server has not response to the file request; and redirecting the file request from the first path included in the file request to a second path designation by the file request redirection driver.

30. A data processing system for optimizing remapping a path to file servers, wherein the data processing system has a resident operation system and at least one application, the system comprising:

determining means for determining if a file request has been presented to the operation system for a file request redirection driver, wherein the file request includes a first path to a file, and wherein the file request is initiated by the application;

calling means for calling the next file request redirection driver;

identifying means for identifying a list of destination location servers for a specific file request;

transmitting means for transmitting a test signal to each destination location server in the list of destination location servers;

receiving means for receiving a response from each destination location server acknowledging that each destination location server received the transmitted test signal;

measuring means for measuring the response time associated with each destination location server; and reordering means for reordering the list of destination location servers based on the response time associated with each destination location server.

31. A computer program product implemented in a data processing system implemented method for remapping a path to file servers wherein the computer program product is stored on a computer readable medium and comprises a series of instructions, the instructions comprising:

presenting instructions for presenting a file request to the operating system, wherein the file request includes a first path to file, and wherein the file request is initiated by the application;

calling instructions for calling a file request redirection driver;

indexing instructions for indexing the file request to a second path designated by the file request redirection driver, wherein the indexing the file includes sequentially traversing a destination location list and assigning a next available destination location server on the destination location list as a destination location server for a second path and wherein the destination location server is the destination location server;

receiving instructions for receiving no response from the first destination location server for a second path;

traversing instructions for sequentially traversing the destination location list;

assigning instructions for assigning a next available destination location server as a second destination location server for a third path; and redirecting instructions for redirecting the file request from the first path included in the file request to the third path designated by the file request redirection driver.

32. The computer program product recited in claim 31, further comprising:

determining instructions for determining a type of the file request, wherein at least one of the second and the third path is designated by the file request redirection driver based on the type of the file request.

* * * * *

UNITED STATES PATENT AND TRADEMARK OFFICE
CERTIFICATE OF CORRECTION

PATENT NO. : 6,571,280 B1  
DATED : May 27, 2003  
INVENTOR(S) : Hubacher

It is certified that error appears in the above-identified patent and that said Letters Patent is hereby corrected as shown below:

Column 6,  
Line 16, after "(step 602).", delete carriage return.

Column 9,  
Line 6, after "(step 1016).", delete carriage return.

Column 10,  
Line 50, delete "destination a non-response destination" and insert -- designating a non-responsive destination --.  
Line 57, after "path", delete "designation" and insert -- designated --.

Column 11,  
Line 9, after "claim", delete "21" and insert -- designated --.  
Line 30, delete "file" and insert -- the file --.  
Line 42, after "assigning" delete "a".  
Line 48, after "has", delete "response" and insert -- responded --.  
Line 51, after "not", delete "response" and insert -- responded --.  
Line 53, after "path", delete "designation" and insert -- 20 --.

Column 12,  
Line 13, after "the", delete "method" and insert -- system --.  
Line 16, delete "operating" and insert -- operation --.  
Line 17, after "path to", insert -- a --.  
Line 30, after "for", insert -- sequentially --.  
Line 37, delete "designation" and insert -- designated --.  
Line 38, delete "The method" and insert -- The system --.  
Line 39, after "backup", delete "installation" and insert -- installable --.  
Line 45, delete "The method" and insert -- The system --.

Column 13,  
Line 3, delete "The method" and insert -- The system --.  
Line 9, after "wherein the", delete "determination" and insert -- determining --.  
Line 12, after "of", insert -- the --.  
Line 14, after "of", insert -- the --.  
Line 18, after "the" delete "method" and insert -- system --.  
Line 21, delete "operating" and insert -- operation --.  
Line 22, after "path to", insert -- a --.  
Line 28, after "means for", delete "simultaneous" and insert -- simultaneously --.  
Line 30, after "assigning", delete "a next available destination location server" and insert -- all available servers as destination location servers --.  
Line 36, after "has", delete "response" and insert -- responded --.  
Line 40, after "not" delete "response" and insert -- responded --.  
Line 43, after "path", delete "designation" and insert -- designated --.

UNITED STATES PATENT AND TRADEMARK OFFICE
CERTIFICATE OF CORRECTION

PATENT NO. : 6,571,280 B1
DATED : May 27, 2003
INVENTOR(S) : Hubacher

It is certified that error appears in the above-identified patent and that said Letters Patent is hereby corrected as shown below:

Column 14,
Line 21, delete "operating" and insert -- operation --.
Line 22, after "path to", insert -- a --.
Line 28, after "wherein", delete "the".
Line 28, after "file", insert -- request --.
Line 33, after "the" insert -- first --.
Line 49, after "second" insert -- path --.

Signed and Sealed this

Twentieth Day of January, 2004

JON W. DUDAS
*Acting Director of the United States Patent and Trademark Office*